(12) United States Patent
Brahmeshwarkar et al.

(10) Patent No.: US 10,724,857 B1
(45) Date of Patent: Jul. 28, 2020

(54) REAL-TIME BOLT MONITORING SYSTEM

(71) Applicant: Smart Wires Inc., Union City, CA (US)

(72) Inventors: Susheel Brahmeshwarkar, Oakland, CA (US); Antonio Ginart, Santa Clarita, CA (US)

(73) Assignee: Smart Wires Inc., Union City, CA (US)

( * ) Notice: Subject to any disclaimer, the term of this patent is extended or adjusted under 35 U.S.C. 154(b) by 0 days.

(21) Appl. No.: 16/235,710

(22) Filed: Dec. 28, 2018

Related U.S. Application Data

(60) Provisional application No. 62/758,285, filed on Nov. 9, 2018.

(51) Int. Cl.
| | | |
|---|---|---|
| *G01B 17/00* | (2006.01) | |
| *G01N 29/04* | (2006.01) | |
| *G01N 29/22* | (2006.01) | |
| *G01N 29/30* | (2006.01) | |
| *G01N 29/24* | (2006.01) | |

(52) U.S. Cl.
CPC ............ *G01B 17/00* (2013.01); *G01N 29/041* (2013.01); *G01N 29/227* (2013.01); *G01N 29/24* (2013.01); *G01N 29/30* (2013.01); *G01N 2291/0234* (2013.01); *G01N 2291/101* (2013.01); *G01N 2291/2691* (2013.01)

(58) Field of Classification Search
CPC ........ G01B 17/00; G01N 29/24; G01N 29/30; G01N 29/227; G01N 29/041; G01N 2291/0234; G01N 2291/2691; G01N 2291/101
See application file for complete search history.

(56) References Cited

U.S. PATENT DOCUMENTS

| | | | |
|---|---|---|---|
| 4,437,619 A | | 3/1984 | Cary et al. |
| 4,569,229 A | * | 2/1986 | de Halleux ............. G01L 5/246 411/14 |
| 5,220,839 A | * | 6/1993 | Kibblewhite ......... B06B 1/0662 73/761 |
| 5,259,386 A | | 11/1993 | Sharkawy |
| 5,363,852 A | | 11/1994 | Sharkawy |
| 5,829,438 A | | 11/1998 | Gibbs et al. |
| 5,851,188 A | | 12/1998 | Bullard et al. |
| 6,183,426 B1 | | 2/2001 | Akisada et al. |

(Continued)

*Primary Examiner* — David Z Huang (74) *Attorney, Agent, or Firm* — Womble Bond Dickinson (US) LLP (57) ABSTRACT

A fastening system for securing and real-time monitoring of a bolted connection is described. An ultrasonic signal is used to measure time-of-flight in the bolt and calculate an effective length of the bolt. By comparing the calculated effective length against reference values, a loosened bolt may be detected, and a real-time decision can be made to initiate protective measures and/or make a report to a support system. The measuring subsystem can be configured to be electrically isolated, and the bolted connection may include a live electrical connection. The real-time monitoring can provide early warning of potential system failures across any system having bolted connections: this includes civil systems such as buildings and bridges, transportation devices such as trains and airplanes and automobiles, and power distribution systems.

18 Claims, 7 Drawing Sheets

(56) References Cited

U.S. PATENT DOCUMENTS

| | | | |
|---|---|---|---|
| 7,698,949 B2 | 4/2010 | Akdeniz et al. | |
| 8,893,557 B2 * | 11/2014 | Mekid | G01L 5/0038 |
| | | | 73/761 |
| 2006/0043722 A1 * | 3/2006 | Hoshino | B62D 1/195 |
| | | | 280/777 |

* cited by examiner

REAL-TIME BOLT MONITORING SYSTEM

CROSS REFERENCE TO RELATED APPLICATIONS

This application claims the benefit of U.S. Provisional Application No. 62/758,285 filed on Nov. 9, 2018, the disclosure of which is incorporated herein by reference.

TECHNICAL FIELD

The present disclosure relates to real-time monitoring of a bolted connection using ultrasonic signals, and more particularly to real-time monitoring of a bolted live electrical connection.

BACKGROUND

Bolted connections are found in civil systems such as buildings and bridges, in transportation devices such as trains and airplanes and automobiles, and in power distribution systems as examples.

A power flow control system is an exemplary system, developed for attachment of power flow control devices to transmission lines for load balancing purposes. The devices comprise impedance injection modules that are inserted in series into the transmission line. Each impedance injection module comprises components connected in series, and each of these series connections typically comprises one or more bolts. Clearly, a failure of such a bolted series connection will break the current in the transmission line, and this will represent a system failure. Thus, one of the biggest risks to a power flow control system is that a bolted connection may loosen, and the associated electrical connection will fail.

Accordingly, there is a need in the art for bolt monitoring systems that can be applied to bolted connections in general, and to live electrical connections in particular, to provide early warning of potential system failures.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In one aspect, a fastening system (e.g., a bolt assembly) with real-time connection monitoring is described. The fastening system includes a bolt having a head and a threaded body, a nut with a threaded hole matched to the threaded body, and an ultrasonic transceiver coupled to the head of the bolt. The ultrasonic transceiver is configured to transmit an ultrasonic signal into the bolt and towards a reflecting surface of the threaded body, where at least a portion of the ultrasonic signal is reflected from the reflecting surface. The ultrasonic transceiver is further configured to receive the portion of the ultrasonic signal reflected from the reflecting surface. The bolt and the nut are configured to fasten a first item and a second item, with the first item and the second item being disposed between the head of the bolt and the nut.

In another aspect, a method for operating a fastening system (e.g., a bolt assembly) with real-time connection monitoring is described. The fastening system includes a bolt having a head and a threaded body, a nut with a threaded hole matched to the threaded body, and an ultrasonic transceiver coupled to the head of the bolt. In some embodiments, an ultrasonic signal is transmitted by the ultrasonic transceiver into the bolt and towards a reflecting surface of the threaded body, where at least a portion of the ultrasonic signal is reflected from the reflecting surface. The portion of the ultrasonic signal reflected from the reflecting surface is received by the ultrasonic transceiver. A time of flight of the transmitted ultrasonic signal is measured by the ultrasonic transceiver responsive to the reflected portion of the ultrasonic signal.

Figure 1:
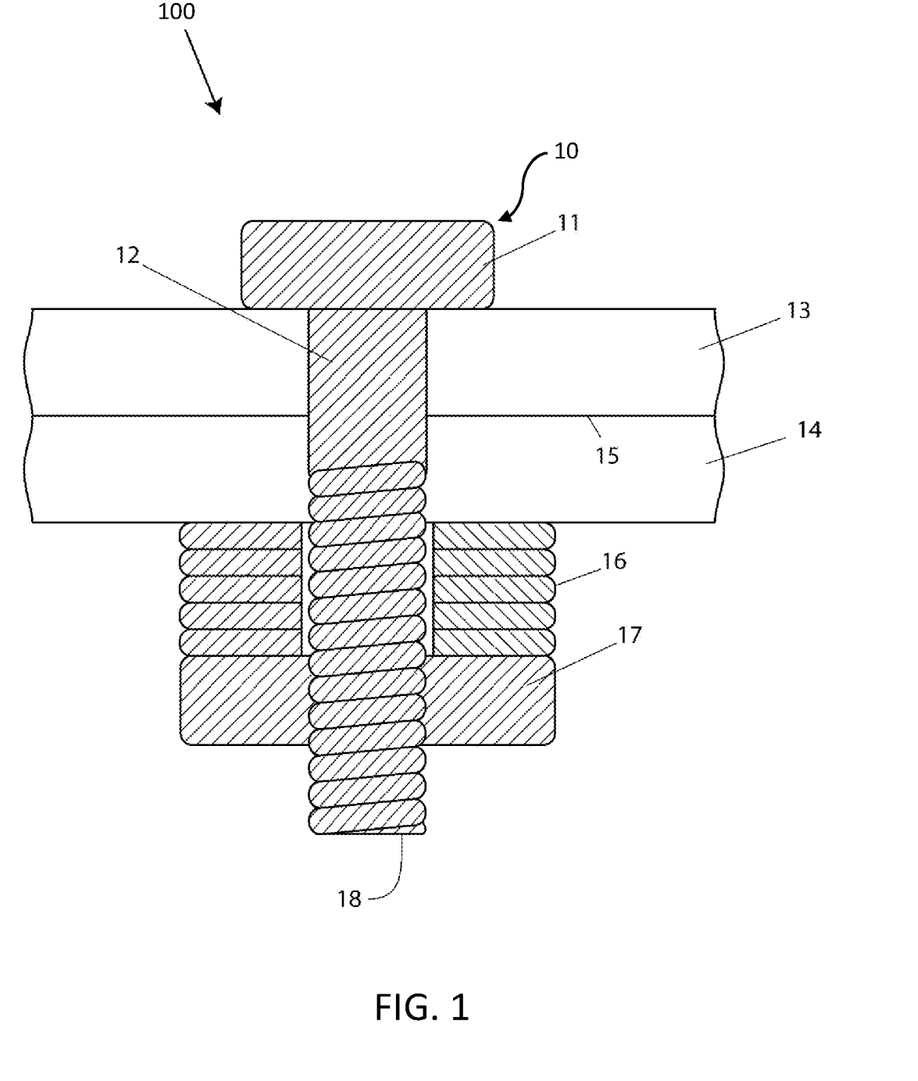
FIG. 1 is a cross-sectional view of a bolt assembly according to one embodiment.

FIG. 1 is a cross-sectional view of a bolt assembly according to one embodiment. Referring to FIG. 1, a bolt (or fastening) assembly 100 includes a bolt 10 and a nut 17. Bolt 10 may include a bolt head 11 and an elongated bolt body 12. Nut 17 includes a threaded hole (not shown) and is matched by thread to the thread of the bolt body 12. In one embodiment, bolt body 12 may have a flat shaped surface 18 at its distal end for reflecting ultrasonic signals (as described in more detail herein below). In one embodiment, bolt assembly 100 may include a number of disk springs 16 that provide a minimum level of tension in bolt body 12 under normal operation. As shown, bolt assembly 100 may be utilized to fasten a first to-be-fastened item 13 and a second to-be-fastened item 14, with first and second items 13 and 14 having a common mating surface (or interface) 15. Although not shown in FIG. 1, in one embodiment, bolt assembly 100 may be equivalently replaced by a threaded member having a nut at each end.

In one embodiment, the first and second to-be-fastened items 13 and 14 are bus-bars of an electrical system, and it is critical to sufficiently clamp to two items 13 and 14 together in order to achieve a low contact resistance at common interface 15. In one embodiment, a desirable value for contact resistance may be less than ten (10) micro-ohms, for example.

Figure 2:
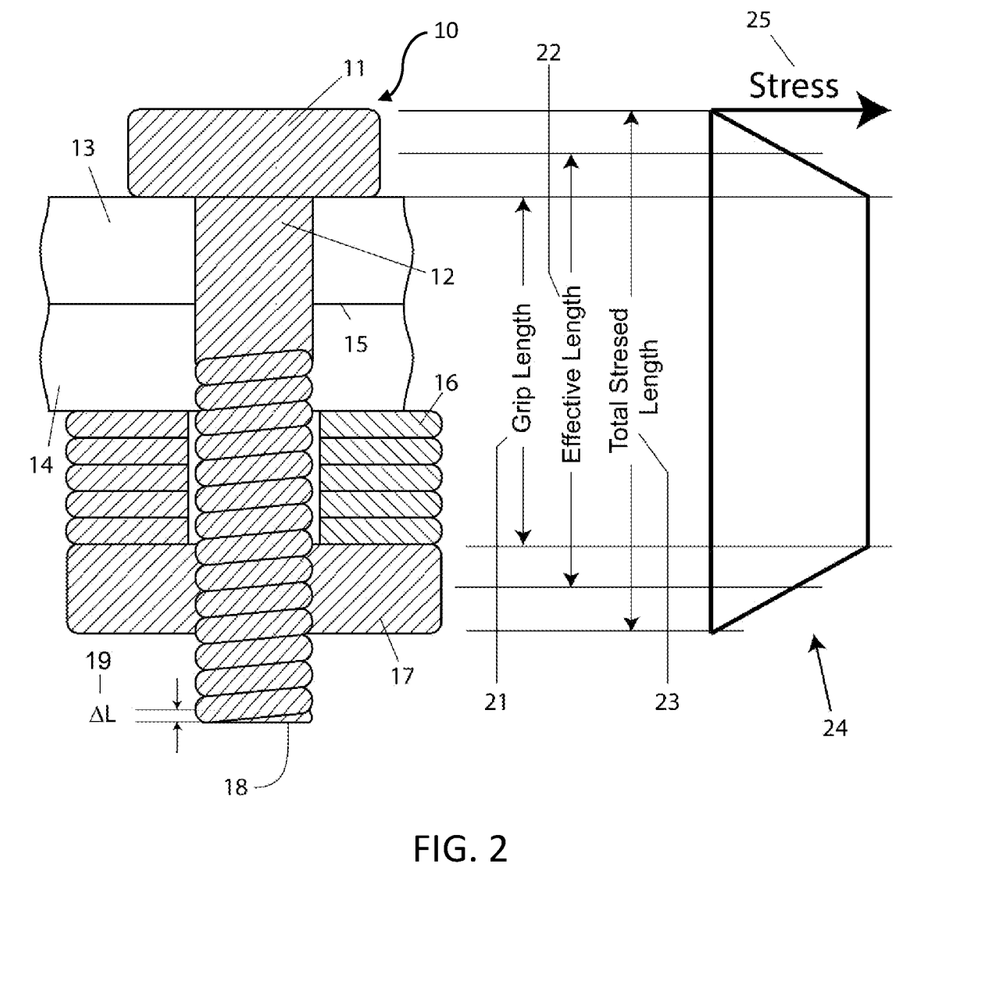
FIG. 2 is a cross-sectional view of a bolted connection with a graph of stress versus distance along a bolt according to one embodiment.

FIG. 2 is a cross-sectional view of a bolted connection with a graph of stress versus distance along a bolt according to one embodiment. In FIG. 2, a grip length 21, effective length 22, and a total stressed length 23, together with a plot of mechanical stress 24 distributed along the bolt body 12 are illustrated. The effective length 22 is defined as the equivalent constant stress length of a fastener (e.g., bolt 10). The stress/strain relationship shown in the figure illustrates Hooke's Law, where the strain ΔL/L produced in the bolt 10 is proportional to the stress, Fp/As:

Fp/As=E×ΔL/L where Fp=preload force
As=tensile area of the fastener
E=modulus of elasticity
ΔL=stretch (shown as 19 in FIG. 2)
L=the initial unstressed length of the bolt 10

Experience has shown that measuring applied torque using a torque wrench, when fastening a bolt 10 as in the present disclosure, provides a poor measure of the effective length of the bolt. This is because friction under the bolt head 11 can be associated with as much as 40-70% of the applied torque, and friction in the threads can similarly be associated with as much as 40-60% of the applied torque. Thus, the desired load on the bolt 10 may represent only 8-16% of the applied torque, providing an unreliable indicator of the effective length.

Figure 3:
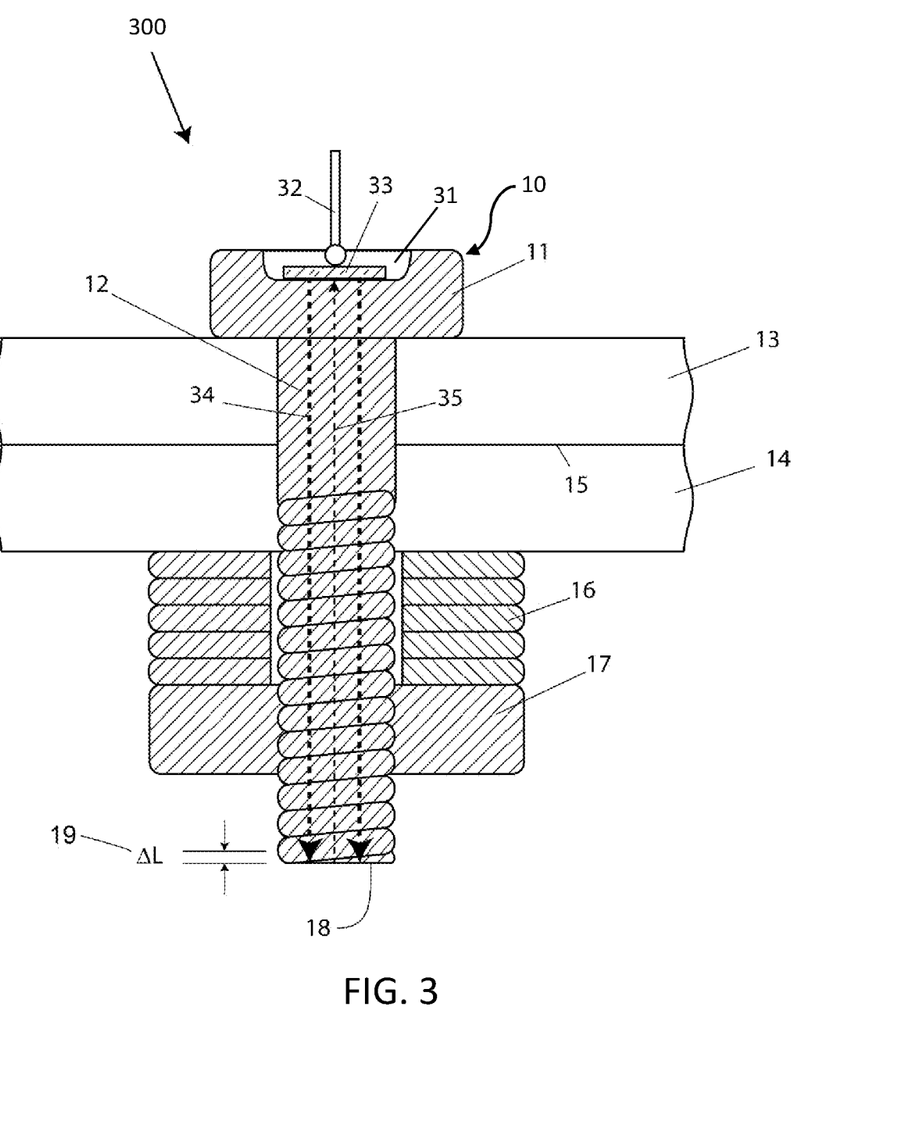
FIG. 3 is a cross-sectional view of a bolted connection showing a path of ultrasonic sound waves injected into the bolt according to one embodiment.

FIG. 3 is a cross-sectional view of a bolted connection showing a path of ultrasonic sound waves injected into the bolt according to one embodiment. In FIG. 3, a modified bolt assembly 300 is shown, where a recess 31 is provided in bolt head 11. As further shown, a probe 32 may be used to contact an ultrasonic sending and receiving chip (or ultrasonic transceiver) 33 that is mounted in the recess 31. In one embodiment, probe 32 is spring mounted to avoid damaging chip 33. Ultrasonic sending and receiving chip 33 may include a piezo electric material that can be used to excite sound waves at ultrasonic frequencies. The same material, typically provided in a layer on chip 33, can also be used to detect a reflected ultrasonic signal. In one embodiment, the frequency range of the excitation is 5-10 MHz.

Still referring to FIG. 3, an excited sound wave (ultrasonic signal) 34 traveling from chip 33 to reflecting surface 18 of the bolt body 12 is shown. A reflected ultrasonic signal 35 (sound wave) is shown traversing the bolt body 12 back to the chip 33. As one of ordinary skill in the art would appreciate, sound wave 34 is reflected to generate reflected ultrasonic signal 35 when it strikes an interface between materials (i.e., the difference in acoustic impedance). In the example of FIG. 3, the interface is located at reflecting surface 18, where the materials may include the material of bolt 10 (e.g., steel) and air (where the distal end of bolt 10 is exposed). It should be noted that the example shown in FIG. 3 is not limiting, and that sound wave 34 may be reflected by any combination of different materials.

With continued reference to FIG. 3, chip 33 initiates the sound wave excitation upon receiving a digital signal via probe 32. Programmed into chip 33 are parameters that set an expected range for effective length. The expected range is based on frequency of excitation, temperature, operating gain, material properties of the bolt 10, and/or a reference length value. Other parameters may also be used in some embodiments. Accordingly, chip 33 has enough intelligence to apply the ultrasonic signal 34, go quiet while it waits for the reflected ultrasonic signal 35, and encode the measured time of flight into a voltage that can be returned to a controller (described in more detail herein below) via probe 32. Persons of skill in the art will understand that many alternative embodiments of the ultrasonic sending and receiving chip 33 are possible, including non-chip-based embodiments.

Figure 4:
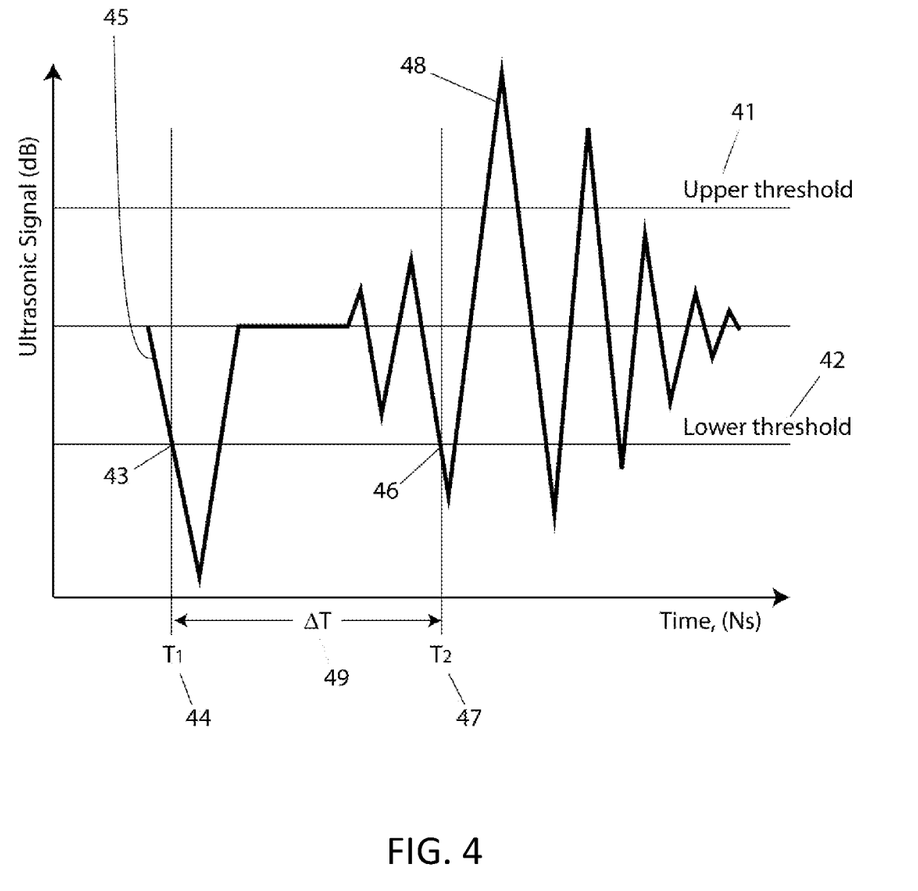
FIG. 4 is a graph of signal strength versus time for an injected ultrasonic signal and its reflection.

FIG. 4 is a graph of signal strength versus time for an injected ultrasonic signal and its reflection. In FIG. 4, a sequence of ultrasonic signals is illustrated. Signal strength of the ultrasonic signals is shown in decibel (dB), and time is shown with units of nanoseconds. An upper threshold 41 is shown and a lower threshold 42. A crossing point 43 of lower threshold 42 occurs at time $T_1$ (designated as numeral 44) for the incident signal 45. Similarly, a crossing point 46 of lower threshold 42 occurs at time $T_2$ (designated as numeral 47) for the reflected signal 48. The difference between $T_2$ and $T_1$ is ΔT (designated as numeral 49), the time of flight. Crossing points at either threshold are acceptable for computing time of flight. Since the reflected signal 48 is attenuated with respect to the incident signal 45 due to scattering and other factors, the operating gain inside of chip 33 is adjusted to achieve a strong response signal as shown in the figure.

Figure 5:
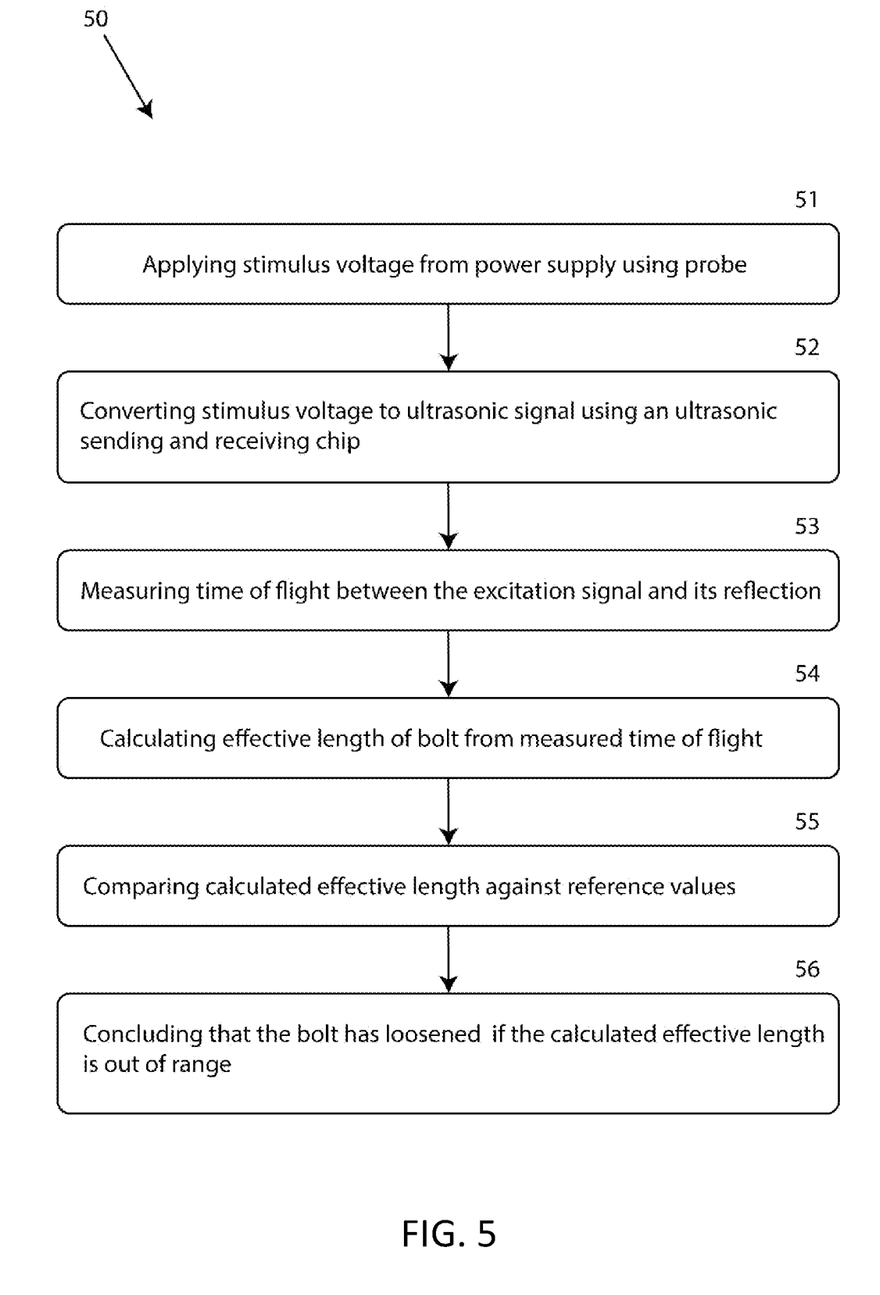
FIG. 5 is a flow chart of a method for monitoring a bolt assembly in real-time according to one embodiment.

FIG. 5 is a flow chart of a method for monitoring a bolt assembly in real-time according to one embodiment. In some embodiments, process 50 may be performed by ultrasonic sending and receiving chip (or ultrasonic transceiver) 33, probe 32, controller 65, or a combination thereof. Referring to FIG. 5, at block 51, process 50 may apply a stimulus voltage from a power supply using a probe (e.g., probe 32). At block 52, the process may convert the stimulus voltage into an ultrasonic signal using an ultrasonic sending and receiving chip (e.g., chip 33). At block 53, the process may measure the time of flight between the excitation signal (e.g., ultrasonic signal 34) and its reflection (e.g., ultrasonic signal 35). At block 54, the process calculates the effective length of the bolt from the measured time of flight. At block 55, the process compares the calculated effective length against reference values. At block 56, the process concludes that the bolt has loosened if it is determined that the calculated effective length is out of range.

Figure 6:
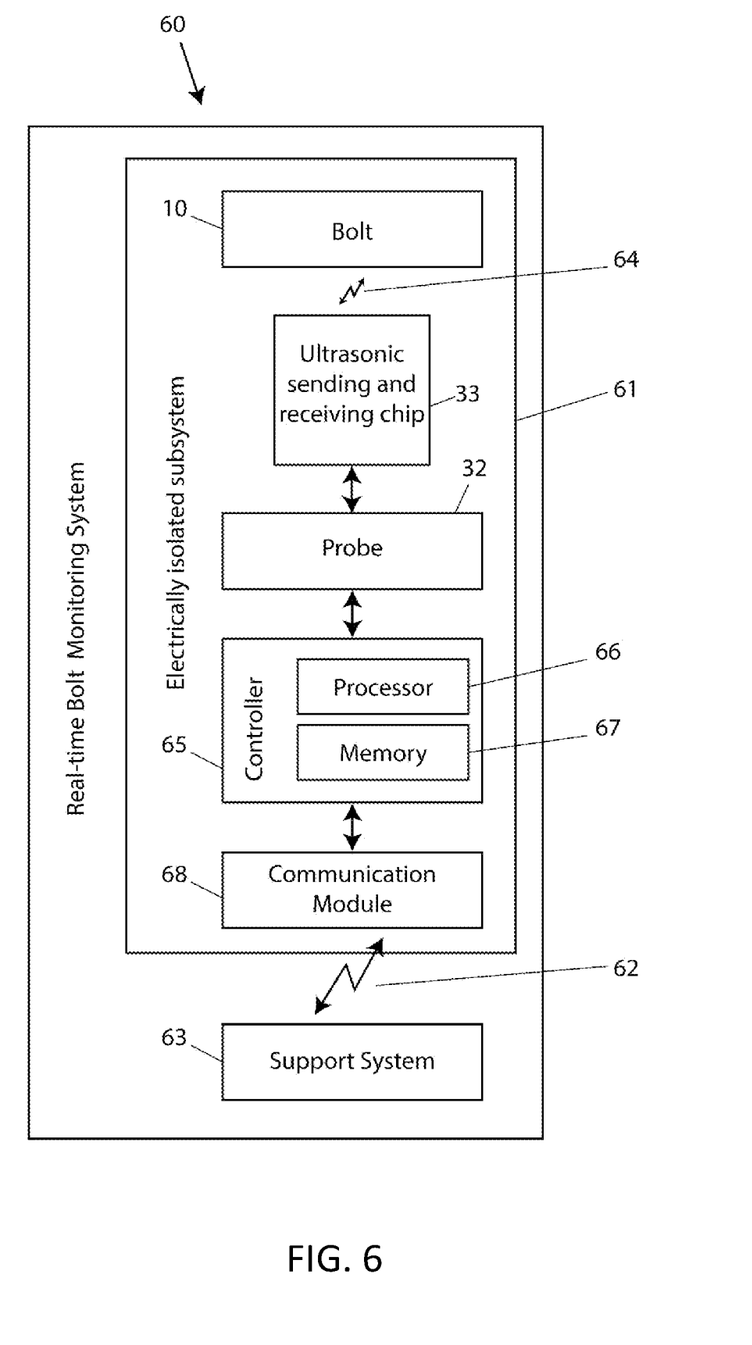
FIG. 6 is a block diagram of a real-time bolt monitoring system including an electrically isolated subsystem according to one embodiment.

FIG. 6 is a block diagram of a real-time bolt monitoring system including an electrically isolated subsystem according to one embodiment. In FIG. 6, a real-time bolt monitoring system 60 includes an electrically isolated subsystem 61 and an external support system 63 that communicate with one another via wireless communication link 62. For the case of monitoring a transmission line, the external support system 63 may be a computer system that resides in a substation, for example. The electrical isolation enabled by wireless communication link 62 allows for monitoring a bolted assembly that may be floating at a transmission line potential of 250 kV for example.

Basic operating information is typically collected by processor 66 and retained in memory 67 of controller 65. Critical subsets of this information may be wirelessly transferred to external support system 63 via wireless communication link 62.

Inside of subsystem 61 is an ultrasonic sending and receiving chip 33 that is communicating with the bolt 10 using ultrasonic signals 64. Probe 32 is contacting chip 33 for initiating a measurement by launching a sound wave (or ultrasonic signal) into the bolt 10 and receiving a reflected signal (echo) from a distal end of the bolt 10. Probe 32 is connected to a controller 65 that includes processor 66 and memory 67. Memory 67 contains instructions executable by processor 66 for controlling the real-time bolt monitoring system 60. Controller 65 connects with a communication module 68 that communicates wirelessly with an external support system 63 via wireless communication link 62. In one embodiment, controller 65 may send a signal to probe 32 to initiate a transmission of an ultrasonic signal into bolt 10 (as previously described). A portion of the ultrasonic signal is reflected at a reflecting surface (e.g., surface 18) of bolt 10, where the reflected ultrasonic signal is received by ultrasonic sending and receiving chip 33. Ultrasonic sending and receiving chip 33 amplifies the reflected ultrasonic signal, compares it against the transmitted ultrasonic signal (thereby measuring a time of flight of the transmitted and reflected ultrasonic signals), and communicates the measured time of flight to controller 65. In one embodiment, the measured time of flight may be encoded by ultrasonic sending and receiving chip 33 prior to sending it to the controller 65. Controller 65 may store the measured time of flight in memory 67. Based on the measured time of flight, controller 65 may calculate an effective length of the bolt 10. In one embodiment, controller 65 may determine whether the calculated effective length is outside an expected length range. For example, controller 65 may compare the calculated effective length against reference length values programmed in ultrasonic sending and receiving chip 33 (or stored in memory 67) in order to determine whether the calculated effective length is outside the expected length range. If the effective length is determined to be outside of the expected length range, controller 65 may determine there is a potential system fault (as discussed in more detail herein below) and communicate such information to support system 63. In one embodiment, controller 65 may control operations (i.e., open/close) of a bypass switch, such as bypass switch 75 described in more detail herein below, based on the determination as to whether the calculated effective length is outside the expected length range.

Electrical isolation of subsystem 61 may be retained by powering it using the secondary winding of a transformer that is fed to a small power supply, or by using a rechargeable energy storage device such as a battery or a fuel cell. If electrical isolation is not required in a particular application, the subsystem 61 may be directly connected to a power source, such as a direct current (DC) power supply having a ground reference.

Figure 7:
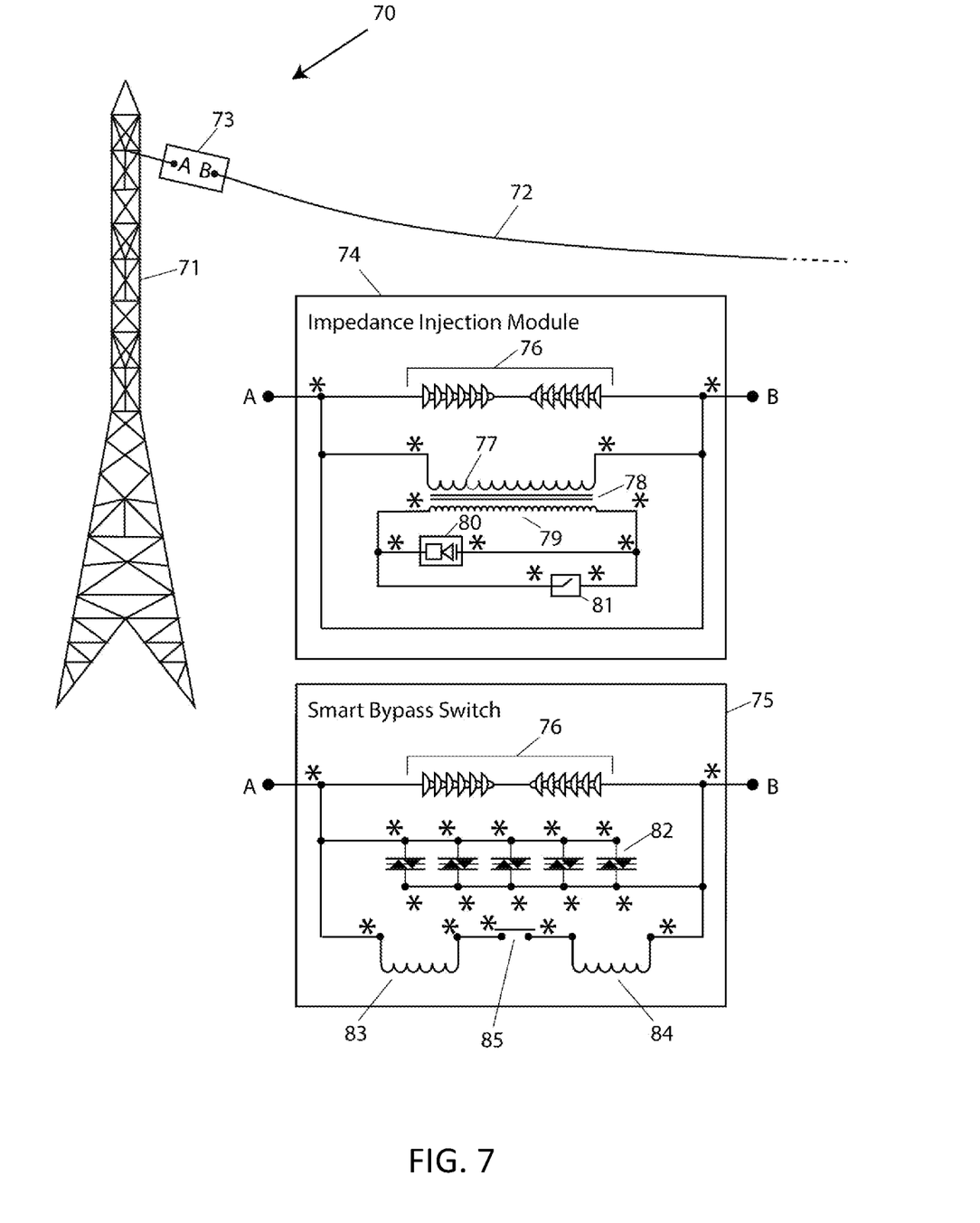
FIG. 7 is a schematic drawing that shows how exemplary modules may be attached to a transmission line using a tower, and potential locations for bolt monitoring equipment.

As an exemplary system that may utilize a real-time bolt monitoring system 60 (as previously described), FIG. 7 depicts a tower 71 as a component of a power distribution system 70, including a transmission line 72. For insertion of load balancing equipment in series with transmission line 72, the transmission line 72 is cut at nodes A and B (designated as numeral 73). As exemplary modules that may be inserted at nodes A and B, an impedance injection module 74 and a bypass switch 75 are shown. Impedance injection module 74 includes an insulator leg 76 which is used to support the weight of the transmission line 72 including the inserted module. A transformer having a primary winding 77, a core 78, and a secondary winding 79 may be assembled around the transmission line. In parallel with the secondary winding 79 may be a series of high current switches 80, such as silicon-controlled rectifiers (SCRs), for protectively handling fault currents, and a bypass switch 81 for bypassing the inserted module for maintenance purposes, and for protecting the power distribution system from faults that may arise in the inserted module, or from short circuits from the transmission line to another transmission line or to ground.

A person of skill in the art will understand that real-time bolt monitoring systems of the present disclosure may be applied in any system that includes bolt fasteners. Exemplary systems may include power distribution systems such as described herein, civil engineering structures such as buildings and bridges, transportation systems such as trains, airplanes and automobiles, and any other form of bolted apparatus.

Bypass switch 75 includes an insulator leg 76 as with other insertable modules. A series of high current switches 82 may be provided for protectively handling fault currents. The high current switches may be silicon-controlled rectifiers (SCRs) for example. Also shown in parallel with the high current switches are a pair of differential mode chokes (DMCs) 83, 84, and a vacuum interrupter (VI) 85 for managing current flow during a fault condition. Power may be provided to impedance injection module 74 or to bypass switch 75 using a small current transformer (not shown) that transfers a small amount of power from the transmission line 72. This transferred alternating current (AC) power may be rectified in a small power supply having DC voltage outputs.

In each of impedance injection module 74 and bypass switch 75 asterisks (*) are used to indicate optional locations for bolt monitoring systems of the present disclosure. Each node in a series-connected leg may be instrumented in this manner to provide early warning of a potential system fault. The fault may be categorized in order of its potential impact on a power distribution system, such as system 70. For example, a level 1 response may indicate that a bolt is beginning to come loose; a level 2 response may indicate that immediate re-torque or adjustment is required, for example in 1-5 days; a level 3 response may indicate an emergency, where all available steps will be taken to prevent interruption of the line current in transmission line 72. Among the actions to be taken, a bypass switch may be immediately and automatically closed, in the case of a direct fault between phases of a transmission line for example, or a message may be sent to a system operator associated with a support system such as support system 63. The system operator will consider the location of the faulty bolted connection and take appropriate action.

A real time bolt monitoring system of the present disclosure may be used to characterize a fault current after the event has occurred. A stored value of time of flight or of the associated effective length may be retrieved and, based on a calculation using the stored value, an inference or prediction can be made about the magnitude of the fault current.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A fastening system with real-time connection monitoring, the system comprising:
a bolt having a head and a threaded body;
a nut matched to the threaded body;
an ultrasonic transceiver coupled to the head of the bolt, the ultrasonic transceiver being configured to transmit an ultrasonic signal into the bolt and towards a reflecting surface of the threaded body wherein at least a portion of the ultrasonic signal is reflected from the reflecting surface, to receive the portion of the ultrasonic signal reflected from the reflecting surface, and to measure a time of flight of the transmitted ultrasonic signal responsive to the reflected portion of the ultrasonic signal;

a probe in contact with the ultrasonic transceiver wherein the probe comprises a spring-loaded pin for contacting the ultrasonic transceiver; and a controller connected to the probe and configured to initiate the transmission of the ultrasonic signal using the probe, calculate an effective length of the bolt based on the measured time of flight, and determine whether the calculated effective length is outside an expected length range;

wherein the bolt and the nut are configured to fasten a first item and a second item, the first item and the second item being disposed between the head of the bolt and the nut.

2. The fastening system of claim 1, wherein the ultrasonic transceiver comprises a layer of piezo electric material.

3. The fastening system of claim 1, wherein the ultrasonic transceiver comprises an integrated circuit (IC) chip.

4. The fastening system of claim 1, wherein the first item and the second item share a common mating surface.

5. The fastening system of claim 1, further comprising a disk spring disposed between the head of the bolt and the nut.

6. The fastening system of claim 1, wherein the ultrasonic transceiver is programmed with configuration parameters that set the expected range for the effective length of the bolt.

7. The fastening system of claim 6, wherein the configuration parameters comprise at least one of: material properties of the bolt, temperature, frequency of excitation, operating gain, or a reference length value.

8. The fastening system of claim 1, wherein the head of the bolt is replaced by a second nut matched to the threaded body.

9. The fastening system of claim 1, wherein an electrical connection is created when the first item and the second item are fastened by the bolt and nut.

10. The fastening system of claim 9, wherein the electrical connection is a live connection.

11. The fastening system of claim 9, further comprising a communication module to wirelessly communicate with an external support system, wherein the electrical connection, the ultrasonic transceiver, and the communication module are included in a subsystem that is electrically isolated from ground.

12. The fastening system of claim 11, wherein the fastening system is part of a power distribution system.

13. A method for operating a fastening system with real-time connection monitoring, the fastening system comprising a bolt having a head and a threaded body, a nut matched to the threaded body, and an ultrasonic transceiver coupled to the head of the bolt, the method comprising:

transmitting, by the ultrasonic transceiver, an ultrasonic signal into the bolt and towards a reflecting surface of the threaded body, wherein at least a portion of the ultrasonic signal is reflected from the reflecting surface;

receiving, by the ultrasonic transceiver, the portion of the ultrasonic signal reflected from the reflecting surface;

measuring, by the ultrasonic transceiver, a time of flight of the transmitted ultrasonic signal responsive to the reflected portion of the ultrasonic signal;

calculating an effective length of the bolt based on the measured time of flight;

determining whether the calculated effective length is outside an expected length range by comparing the calculated effective length against reference length values; and controlling operations of a bypass switch based on the determination.

14. The method of claim 13, further comprising determining that the bolt has loosened in response to determining that the calculated effective length is outside the expected length range.

15. The method of claim 14, further comprising subsequent to measuring the time of flight of the transmitted ultrasonic signal, encoding by the ultrasonic transceiver the measured time of flight; and communicating by the ultrasonic transceiver the encoded time of flight to a controller included in the fastening system using a probe in contact with the ultrasonic transceiver.

16. The method of claim 13, further comprising reporting a system fault to an external support system in response to determining that the calculated effective length is outside the expected length range.

17. The method of claim 13, wherein the bolt and the nut are configured to fasten a first item and a second item that cause mechanical stress to the bolt, the first item and the second item being disposed between the head of the bolt and the nut.

18. The method of claim 13, further comprising:

characterizing a fault current in a transmission line; and predicting a magnitude of the fault current based on the calculated effective length of the bolt.

* * * * *